United States Patent
Noller et al.

(10) Patent No.: US 7,694,181 B2
(45) Date of Patent: Apr. 6, 2010

(54) AUTOMATED SOFTWARE TESTING FRAMEWORK

(75) Inventors: Jesse A. Noller, Hudson, MA (US); Robert S. Mason, Jr., Uxbridge, MA (US)

(73) Assignee: Archivas, Inc., Waltham, MA (US)

( * ) Notice: Subject to any disclaimer, the term of this patent is extended or adjusted under 35 U.S.C. 154(b) by 539 days.

(21) Appl. No.: 11/299,572

(22) Filed: Dec. 12, 2005

(65) Prior Publication Data

US 2007/0234293 A1 Oct. 4, 2007

(51) Int. Cl.
*G06F 11/00* (2006.01)
(52) U.S. Cl. .......................................... 714/38
(58) Field of Classification Search .................. 714/32, 714/38; 717/124
See application file for complete search history.

(56) References Cited

U.S. PATENT DOCUMENTS

| | | | |
|---|---|---|---|
| 5,021,997 A | 6/1991 | Archie et al. | |
| 5,357,452 A | 10/1994 | Pio-di-Savoia et al. | |
| 5,359,546 A | 10/1994 | Hayes et al. | |
| 5,490,249 A | 2/1996 | Miller | |
| 5,500,941 A | 3/1996 | Gil | |
| 5,513,315 A | 4/1996 | Tierney et al. | |
| 5,542,043 A | 7/1996 | Cohen et al. | |
| 5,590,330 A | 12/1996 | Coskun et al. | |
| 5,634,002 A | 5/1997 | Polk et al. | |
| 5,751,941 A * | 5/1998 | Hinds et al. | 714/38 |
| 6,002,869 A | 12/1999 | Hinckley | |
| 6,167,537 A | 12/2000 | Silva et al. | |
| 6,182,245 B1 * | 1/2001 | Akin et al. | 714/38 |
| 6,269,457 B1 * | 7/2001 | Lane | 714/38 |
| 6,301,701 B1 | 10/2001 | Walker et al. | |
| 6,542,841 B1 * | 4/2003 | Snyder | 702/104 |
| 6,662,312 B1 | 12/2003 | Keller et al. | |
| 7,178,065 B2 * | 2/2007 | Dinker et al. | 714/41 |
| 7,428,663 B2 * | 9/2008 | Morton et al. | 714/36 |
| 7,526,681 B2 * | 4/2009 | Anafi et al. | 714/38 |
| 2003/0093716 A1 * | 5/2003 | Farchi et al. | 714/34 |
| 2003/0233600 A1 * | 12/2003 | Hartman et al. | 714/32 |
| 2004/0015866 A1 * | 1/2004 | Estep et al. | 717/124 |
| 2004/0054492 A1 * | 3/2004 | Hagerott et al. | 702/120 |

* cited by examiner

*Primary Examiner*—Scott T Baderman
*Assistant Examiner*—Yair Leibovich
(74) *Attorney, Agent, or Firm*—David H. Judson

(57) ABSTRACT

A generic testing framework to automatically allocate, install and verify a given version of a system under test, to exercise the system against a series of tests in a "hands-off" objective manner, and then to export information about the tests to one or more developer repositories (such as a query-able database, an email list, a developer web server, a source code version control system, a defect tracking system, or the like). The framework does not "care" or concern itself with the particular implementation language of the test as long as the test can issue directives via a command line or configuration file. During the automated testing of a given test suite having multiple tests, and after a particular test is run, the framework preferably generates an "image" of the system under test and makes that information available to developers, even while additional tests in the suite are being carried out. In this manner, the framework preserves the system "state" to facilitate concurrent or after-the-fact debugging. The framework also will re-install and verify a given version of the system between tests, which may be necessary in the event a given test is destructive or otherwise places the system in an unacceptable condition.

28 Claims, 6 Drawing Sheets

```
Hello, This is an automated email from Grinder informing you that the nightly test run is complete. The
details of the test run are below.
Grinder Version: 1.0.17
Date: 05_08_05
Build: latest
Package: /home/grinder/tmp/arc-deploy/package/arc-main-1.0.527.0.tgz
Client: dell-114
Cluster TPOF: 3
Hash: md5
Policy Enabled: true
Cluster: clustern
Cluster Size: 6
Suite: availability
Number of tests ran: 9
Min File Size: 1024
Max File Size: 1024
Max File Count: 5000
Direct Results Link: http://dell-114.archivas.com/grinder/index.php?path=%2Favailability-05_08_05-
1995.4634954 2F
A CSV containing individual test information is attached to this email.

ID,RESULT,NOTES,CLOCKTIME
availability/04a,PASS,Grinder Run,56.997811385
availability/04aLp,PASS,Grinder Run,109.803647304
availability/06a,PASS,Grinder Run,58.3952216983
availability/06aLp,PASS,Grinder Run,46.0320354303
availability/07a,PASS,Grinder Run,58.9957693021
availability/07aLp,PASS,Grinder Run,91.685953033
availability/08a,PASS,Grinder Run,65.7245452007
availability/08aLp,PASS,Grinder Run,216.566842099
```

Figure 6

AUTOMATED SOFTWARE TESTING FRAMEWORK

BACKGROUND OF THE INVENTION

1. Technical Field

The present invention relates generally to quality assurance testing of computer systems and software.

2. Description of the Related Art

There are many well-known approaches to automated testing during the development of a software program or system. During the feature/test development phase, for example, a quality assurance engineer may devise a series of static test cases against which a system under development may be exercised. A set or collection of test cases is sometimes referred to a test suite.

A known software-testing automation system for testing a plurality of deployed images that are spread across multiple software platforms is described in U.S. Pat. No. 6,662,312. In this patent, each deployed image includes a test component configured to accept a connection on a testing port. The test component for a deployed image is inserted in a development environment and is then integrated into the image upon deployment. The system includes a test engine and a user interface. The test engine is configured to run a plurality of tests on the plurality of deployed images. The test engine runs a test on an image under test by requesting a connection to the corresponding test component on the known testing port, and sending commands over the connection. The user interface is connected to the test engine to allow a user to control the test engine and to view test results.

Another such automated system is described in U.S. Pat. No. 6,301,701. This patent describes an automatic testing method for use during the development and other life cycle phases of a transaction-based software application. A transaction tester evaluates the integrity of a transaction by generating test data from the definition of the transaction under test. Typical values for fields may be included within the transaction definition and reused as typical test values. Test results are generated and compared against known-good values or, alternatively, against expected test results also generated from the transaction definition. Other software components may also be tested including menu structures. A definition of the menu structure is rigorously traversed such that each entry of each menu is thoroughly tested and reported. Results are automatically compared and verified against known good results or test results are automatically reviewed. Both transaction testing and menu testing may be incorporated into regression testing.

U.S. Pat. No. 6,002,869 describes a test automation system for performing functional tests of a software program. The system includes a plurality of test functions each configured to test a discrete component of the software program. A user-defined test specification associated with the program provides state definitions that specify a desired test approach for each type of test procedure to be performed on the program. A test engine creates all test cases appropriate for a user-selected test type and controls the software program, applying the test functions and state definitions in accordance with the test specification. All test-specific and software program-specific data are located in the user-defined test functions and specifications while all generic test system processing resides in the test engine. The test specifications are implemented in modifiable text files to maintain concurrency with an evolving software program. The test engine creates possible permutations and combinations for performing a desired test. These test specification includes such items as the states that the software program may possess, the test functions required to transfer between one state and other possible states, information pertaining to the values that specific inputs may have, and the like. During operation, the test engine generates test histories indicating the results of the test performed in accordance with one of the test specifications.

U.S. Pat. No. 5,513,315 describes a system and method for automatically testing software using a deterministic acceptance test and random command sequence selections to uncover errors in computer software. A results analyzer checks test parameters following the execution of each of a series of predetermined test commands and a series of random test commands to determine if the commands were properly executed. The test command sequences and test results determined by the results analyzer are stored in a log file which may be examined by the tester. The randomly selected test command sequence is stored in a tracker log file. The system also provides for error recovery. When an error is detected, the system restarts the test of the computer software and continues maintaining the log file and the tracker file. The system also uses the probabilities for various responses that an end-user may make in response to a particular screen display or program state. The system may select random responses corresponding to the probabilities. These probabilities are calculated for each individual screen display or software state. Because the system executes a random selection of command sequences, program may be tested on multiple machines, thereby decreasing the overall time required for acceptance testing.

U.S. Pat. No. 5,751,941 describes an object-oriented framework for testing software. In this patent, a software testing system includes a set-up and control system, and one or more test systems connected to the set-up and control system. The set-up and control system includes a user interface for interacting with a user of the software testing system. The set-up and control system stores test data and test configurations. Each test system sets up test cases from the test data and the test configurations stored in the set-up and control system. Each test case inherits attributes from at least one test object within the test system. The inherited attributes facilitates the interaction of the test system with the test cases.

Other automated testing systems are described, for example, in U.S. Pat. Nos. 5,021,997, 5,357,452, 5,359,546, 5,490,249, 5,500,941, 5,542,043, 5,590,330, 5,634,002 and 6,167,537. Known prior art testing frameworks also include solutions such as STAF (the Software Testing Automation Framework).

While the above-described patents and systems are generally useful, these techniques are not flexible enough to implement automated software testing in an environment where test cases are written in varied programming languages. Moreover, such prior art systems are often closely coupled with the applications or systems under test and thus are not useful to provide generic testing capabilities. A related deficiency is that such systems are typically written or controlled in reference to the particular tests or test types for the application under development. Thus, the automated system necessarily is an adjunct to the particular application or system being developed and cannot readily support testing of a generic program set or test suite.

BRIEF SUMMARY OF THE INVENTION

It is an objective of the present invention to provide a generic testing framework to automatically allocate, install and verify a latest version of a system under test, to exercise the system against a series of tests in a "hands-off" objective manner, and then to export information about the tests to one or more developer repositories (such as a query-able database, an email list, a developer web server, a source code version control system, a defect tracking system, or the like). The framework does not "care" or concern itself with the particular implementation language of the test as long as the test can issue directives via a command line or configuration file. During the automated testing of a given test suite having multiple tests, and after a particular test is run, the framework preferably generates an "image" of the system under test and makes that information available to developers, even while additional tests in the suite are being carried out. In this manner, the framework preserves the system "state" to facilitate concurrent or after-the-fact debugging. The framework also will re-install and verify a latest version of the system between tests, which may be necessary in the event a given test is destructive or otherwise places the system in an unacceptable condition.

By posting test information to developer repositories, developers have immediate access to test data during the development process. Thus, for example, a developer can query a test data database and identify which particular tests failed on which particular days or system configurations. By publishing results in a web server and notifying developers about particular test runs (e.g., by email or the like), a developer may access such data in a simple and efficient manner (e.g., by selecting a link in an email). The "image" of a particular system under test may also be quite useful in the debugging or development process. Moreover, because a particular test run may generate a failure that needs to be reported to a defect tracking system, preferably the framework readily exports data to such systems where required.

Preferably, the generic testing framework is implemented as a standalone client application (or "daemon") that calls other standalone logic modules (routines, processes, or the like) to perform the various functions required by the client application. Thus, for example, a first such logic module might be a software program that fetches a latest software build for the system under test, a second logic module might be used a separate program to install that build on the system under test, while a third logic module might be a software program that then accesses a version control system to identify a set of tests in a test suite to be executed against the installed build. In one embodiment, the client application and the associated logic modules are executed on a given machine. In a distributed system, the client application may execute on one machine while one or more of the logic modules are executed on one or more other machines. In this manner, a given client application may initiate and "own" a given test suite, even as various tools or functions used to carry out the tests in the suite are being executed on other machines platforms, operating systems or the like. The logic modules may also be shared by one or more client applications, each running on different client machines.

In a representative embodiment, the client application daemon executes waiting for requests to start a test suite (or a given test within a suite). Upon receipt of a request, the framework downloads and then installs a latest software build for the system under test, cleaning the system as necessary before such installation. The framework may download the latest software build from an automated build system (e.g., CruiseControl). As the latest software build is being installed or following installation, the framework automatically verifies that installation is or was successful, as the case may be. The framework then automatically retrieves from a database a test suite definition, which defines the test suite as well as the test files/data associated with the test suite. The test suite definition informs the framework as to the location of those files, e.g., a code repository (such as Perforce, ClearCase, CVS, or the like), and the framework then obtains them. As noted above, the test suite or given tests therein may be tested in the framework irrespective of their implementation language. The framework installs the test suite and begins executing the tests, preferably with each test being independent. The tests may be executed in any order, e.g., in sequence, or randomly. Each test either passes or fails. After a given test in a test suite, the framework images the system under test, which preserves the system "state" for concurrent or future analysis. If necessary (e.g., due to a prior destructive test), the framework then reinstalls the system under test or the latest software build and continues with a next test in the suite. The system configuration may be changed during the reinstall. After all tests in a suite are completed, the framework aggregates the test data and images and exports the test data to a query-able data store, such as a central database accessible via a Web service or the like. An email describing the test suite may then be delivered to one or more persons on an email distribution list. The framework also selectively exports given test data to a defect tracking system (e.g., Bugzilla).

Generalizing, the automated testing framework is a test runner or test harness that automatically allocates, installs and verifies a system under test, that provides a "clean room" environment for tests to be run against that allocated system, that takes "snapshots" of the system between tests, and that reports on test results preferably at a high level ("pass" or "fail"); otherwise, the framework stays out of the way of the tests as they are run. The framework automates the management of the system under test from start to finish while performing testing (e.g., white box testing, black box testing, or the like), preferably using reusable or even external tools and components and language-agnostic tests.

The automated testing framework is flexible, easily extensible, and preferably test-language and client-platform agnostic. It is implemented in such a way as to run any test, in any language. Indeed, tests can be written to run themselves across multiple client hosts and client operating systems.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 illustrates a results email that is automatically generated following execution of a given test suite by the automated framework.

DETAILED DESCRIPTION OF AN EMBODIMENT

The automated testing framework of the invention preferably is implemented as program code executable in a machine (or across multiple machines). The particular machine details or operating environment are not particularly relevant to the present invention. In one embodiment as previously described, the code operates as a standalone application or "daemon" that calls other modules that perform the various functions required by the framework. One of more of such modules may be native to the framework or part of some external system. As also noted, the daemon may execute on one machine while one or more of the service modules execute on the same or other machines. This ensures cross-platform compatibility of the framework.

Figure 1A:
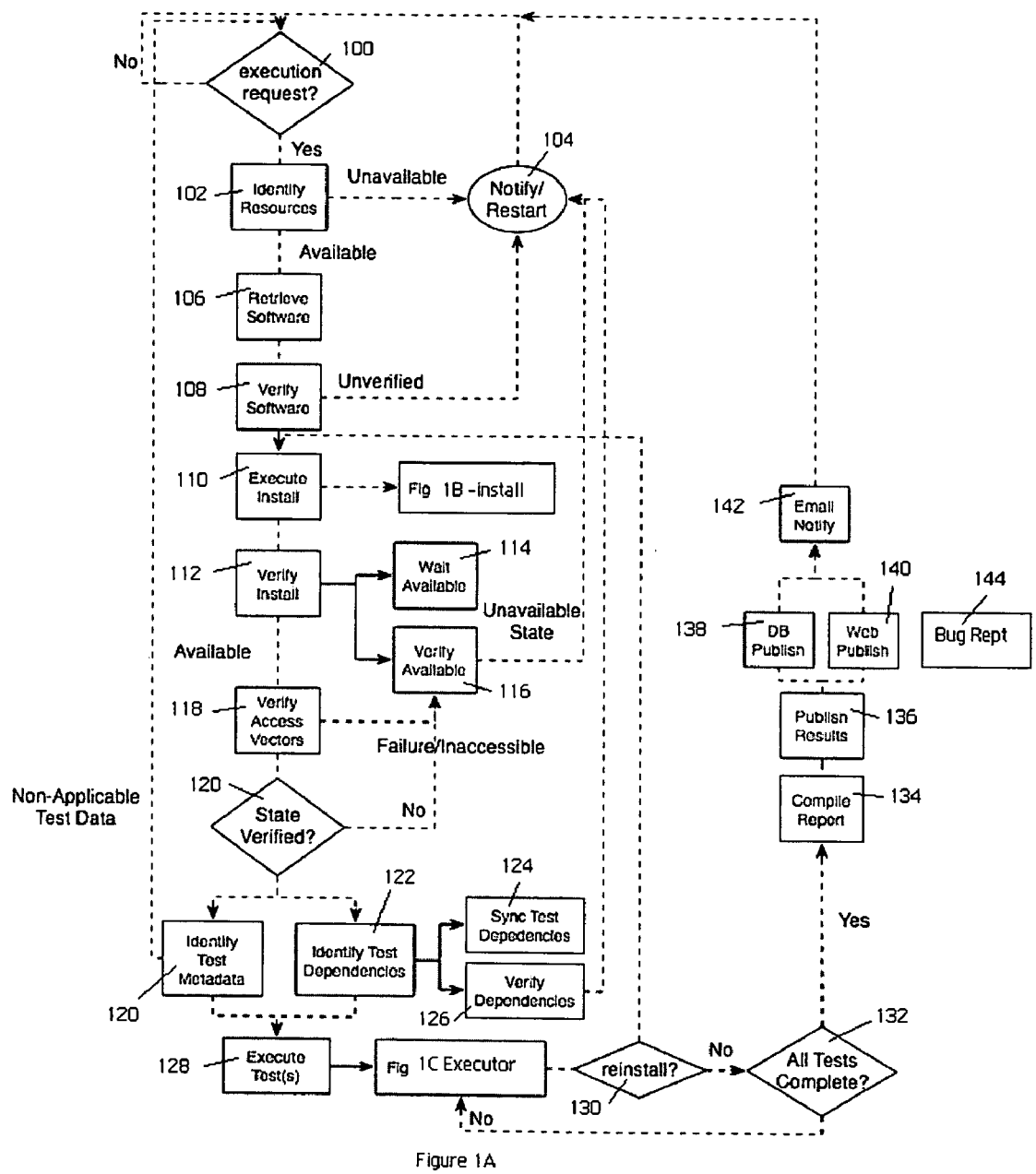
FIGS. 1A-1C are process flow diagrams illustrating an operation of the automated testing framework of the present invention.
Figure 1B:
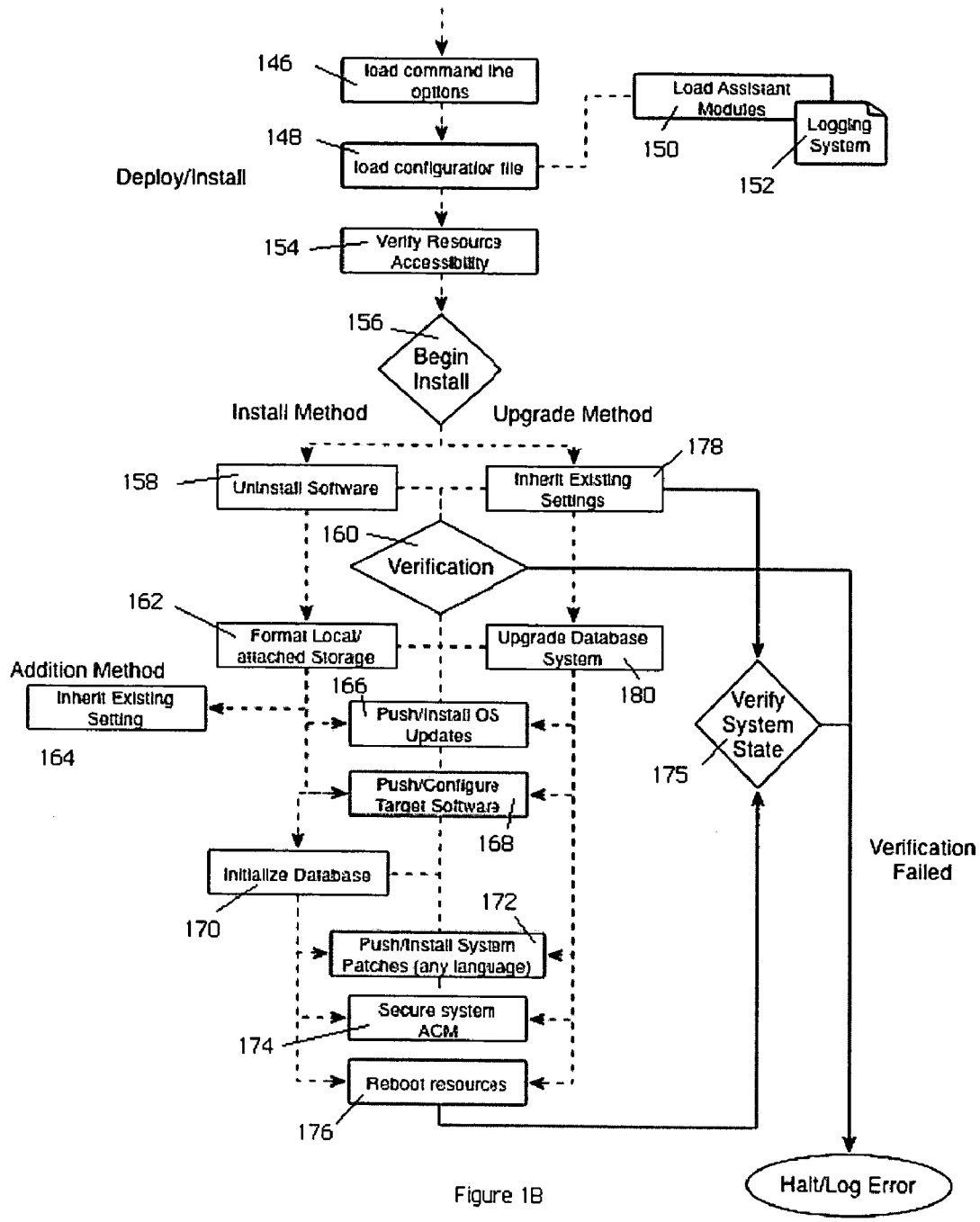
Figure 1C:
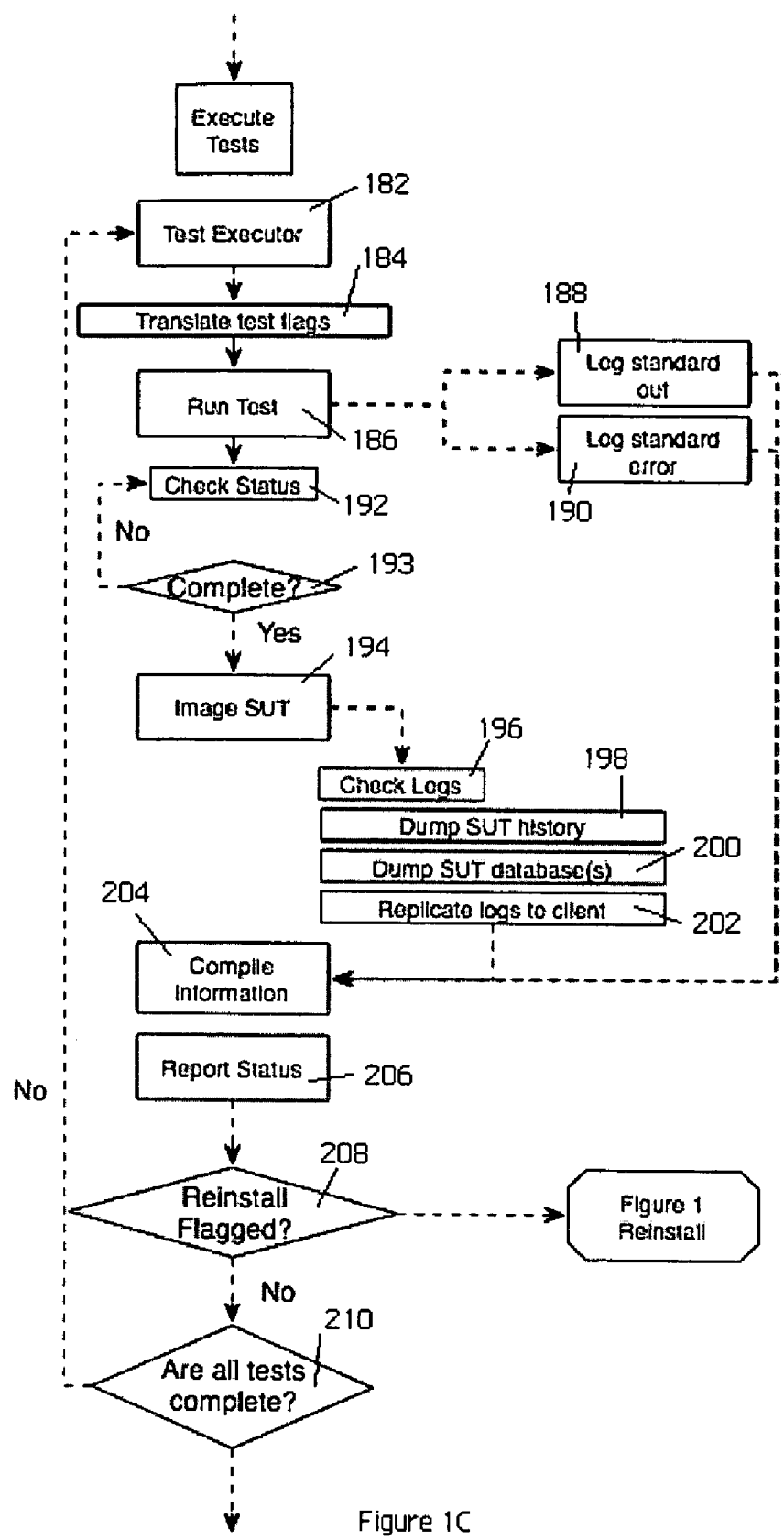

FIGS. 1A, 1B and 1C describe a basic operation of the automated testing framework of the invention with respect to a given "system under test" (or SUT) that, in one example scenario (described below), may be a distributed software application. The phrase "system under test" should be broadly construed to cover any system, product, application, process, machine, or combination thereof. A technical advantage of the invention is that the framework is agnostic to the system under test or the language in which particular tests for the system are written. Thus, the automated testing framework is not limited for use with a particular system under test or type of system. Rather, the framework supports automated testing of any system under test, regardless of whether that system is a standalone or distributed system, regardless of the system environment or purpose, and regardless of the nature and type of application running on the system.

Referring to FIG. 1A, the automated testing framework preferably executes as a daemon testing at step 100 to determine whether any execution request has been received by the framework. If not, the routine cycles waiting for work. When an execution request has been received, the daemon parses the request and identifies the required resources in step 102. The request semantics typically will depend on the nature of the system under test, although typically the request will identify a particular system under test (or SUT configuration), a given software build, a test suite, and a data repository to which test results should be exported. The daemon branches to step 104 and issues a notify/restart command if the required resources are not available, in which case control returns back to step 100. If the resources are available, the framework retrieves software at step 106. Typically, this retrieval (as are one or more other functions described below) is carried out by a separate, callable logic module. In the alternative, the automated testing framework may include such modules as native code, of course. The communication to retrieve the software build may occur locally or over a network. Advantageously, the software retrieved at step 106 is a latest software "build" for the system under test. As is well-known, complex software or software systems often proceed through numerous (e.g., tens or hundreds) of software "builds" during the development and useful life of a given software application. The automated testing framework preferably retrieves the latest software build (or some other designated build, as identified in the request) at step 106, e.g. by having a logic module fetch the build from a source code or other repository, and then performs a verification step at step 108. The nature and scope of this verification will depend on the system under test. If the retrieved build cannot be verified, the routine once again branches to step 104 and then returns to wait for new work. If the software build can be verified, the framework continues at step 110 to execute an install. The details of this step are provided in FIG. 1B and discussed below. At step 112, the framework performs another verification to determine whether the software build was installed correctly. Step 112 may have two sub-steps. At step 114, the framework enters a wait state (while resources are being configured) and begins to test at step 116 whether it can verify the availability of the various resources. If the framework cannot verify the availability of the resources as the install proceeds, once again control is transferred back to step 104 (and, therefore, back to step 100). If, as a result of the verification at step 112 the system under test is found to be available, the process continues at step 118 to verify one or more devices or systems (or "access vectors") that may be required to access the system under test. Any failure of or inaccessibility of the access vectors causes the framework to branch over to step 116, as previously described. At step 120, the framework performs a final verification to determine whether the overall state of the system under test (which may comprise miscellaneous hardware and software in addition to the latest software build) is acceptable or as otherwise necessary to perform the test suite. If the outcome of the test at step 120 is negative, the routine once again branches to step 116, as previously described, to wait for the one or more resources to install correctly.

Now, assuming that the install has been executed and the SUT state verified, the framework is now ready to perform the test suite. Thus, at step 120, the framework identifies test metadata and, at step 122, identifies any test dependencies. If there are dependencies, the framework synchronizes the test dependencies at step 124; at step 126, the framework performs a verification to ensure that this synchronization was successful. If not, the routine branches back to step 104 to notify or restart, as the case may be. Following steps 120 and 122, the framework continues at step 128 to execute the one or more test(s) of the test suite. FIG. 1C illustrates the test execution process and will be described below. After a given test in the test suite is executed, the framework tests at step 130 to determine whether it needs to reinstall the system under test. (As noted above, the system configuration may be changed during a reinstall). This may be necessary, for example, because a given test was destructive to the system or a given resource in the system under test. Alternatively, a user may set a flag that requires the reinstall. If the outcome of the test at step 130 indicates that a system (or component thereof) reinstall is not required, the framework performs a test at step 132 to determine whether all of the tests in the test suite have been completed. If not, the daemon returns to step 128, gets the next test in the suite and executes it. A system configuration may also be changed before the next test in the suit is executed, even if a reinstall is not required or done. If the outcome of the test at step 132 indicates that all of the tests in the test suite are completed, the daemon continues at step 134 to aggregate the test data into a report. The daemon then automatically publishes the results at step 136. As indicated, typically the publishing process includes publishing to a database as indicated at step 138, or publishing to a web server as indicated at step 140. The database may be centralized and typically includes a database management system against which database queries (e.g., SQL) may be executed. The web server may be available on an intranet and typically includes an http, https or ftp service. These are merely representative data repositories. In addition, the daemon may also publish the results or the fact that the test has been completed by notifying email subscribers identified on an email list. This is illustrated as step 142. The particular ordering of the steps in this portion of the process flow diagram is not meant to be limiting of course. In addition, the daemon may publish given information about one or more tests to a defect tracking system, which is step 144.

FIG. 1B, as noted above, illustrates a process flow of a representative install function, which was step 110 in FIG. 1A. The process begins at step 146 with the daemon parsing any load command load options in the execution requests. At step 148, the daemon obtains a load configuration file that identifies a particular system configuration that will be needed for the test. The load configuration file typically identifies a set of one or more load assistant modules 150 that are needed, as well as a logging system 152 that will be used. At step 154, the daemon verifies availability of the resources identified in the load configuration file and then begins the install. In particular, a test is performed at step 156 to determine what type of install is required. The left branch of the process flow diagram illustrates a basic install while the right branch of the diagram illustrates an upgrade install. In the basic branch, the daemon begins at step 158 by uninstalling the software from the system under test. Assuming a positive outcome of a verification step at 160, the daemon then formats local or attached storage at step 162; if necessary, the framework then ensures that the local or attached storage inherits existing storage settings at step 164. At step 166, the framework pushes/installs the operating system. At step 168, the daemon pushes/configures the target software (e.g., the actual software build). At step 170, the framework initializes any database as required for the test. At step 172, the framework pushes/installs any system patches; it then secures the system at step 174. Thereafter, at step 176, the framework re-boots all software resources. These steps ensure a "clean room" environment for the system under test. At step 175, a test is performed to verify overall system state. This corresponds to the test at step 120 in FIG. 1A. If system state cannot be verified, the routine halts and writes to an error log.

The parallel processing path for the upgrade method is similar, with a few minor variations. In this path, the processing begins at step 178 by inheriting existing resource settings as needed. The framework may also branch to step 175 to verify the system state after inheriting existing resources. Following a successful verification at step 160, the framework upgrades a database system at step 180. Any required operating system upgrade install is then performed at step 166, which is this path is also followed at step 168 by the push/configuration of the actual target software to be tested. As before, at step 172, the framework pushes/installs any system patches; it then secures the system at step 174. Thereafter, the framework re-boots all software resources at step 176.

FIG. 1C illustrates how the tests are executed. As noted above, an advantage of the present invention is that the framework is language-agnostic. In other words, the framework does not care what format the tests are written, provided that the test language can issue directives via a command line or a configuration file. The execution routine begins at step 182 to call a test execution module. This routine translates test flags if necessary at step 184. This step may be required if the tests are written in a given language requiring translation of one or more command line or configuration file directives to semantic that is understood by the test execution module. At step 186 a given test is run. The framework logs a standard output at step 188 (when the test runs from start to finish and thus "passes"); it also logs any error output at step 190 (when the test does not complete and thus "fails"). As the test is executing, the execution module checks to determine the status of the test at step 192 and periodically tests to determine its status at step 193. If the test is not complete, the routine returns to step 192. When the outcome of the test at step 192 indicates that the test is complete, the routine images the system under test at step 194 to capture a "snapshot" of the state of one or more SUT resources. This "snapshot" provides particularly valuable information that facilitates prompt and accurate debugging or other maintenance. The "imaging" process preferably has one or more sub-steps: at step 196, the framework checks logs of the various resources; at step 198, the SUT history is dumped; at step 200, the SUT database histories are dumped; at step 202, these logs are replicated, e.g., to the client on which the daemon is executed. The image and the pass/fail information are then added to a compilation at step 204 that is available for subsequent export to the data repositories. At step 206, the execution module reports that the test is completed. A test is then performed at step 208 to determine whether a re-install is flagged or otherwise required. This was step 130 in FIG. 1A. If so, the routine branches and performs the re-install. Following step 208, a test is then run at step 210 to determine if all the tests in the suite are complete; if not, the routine cycles. This completes the processing.

Figure 2:
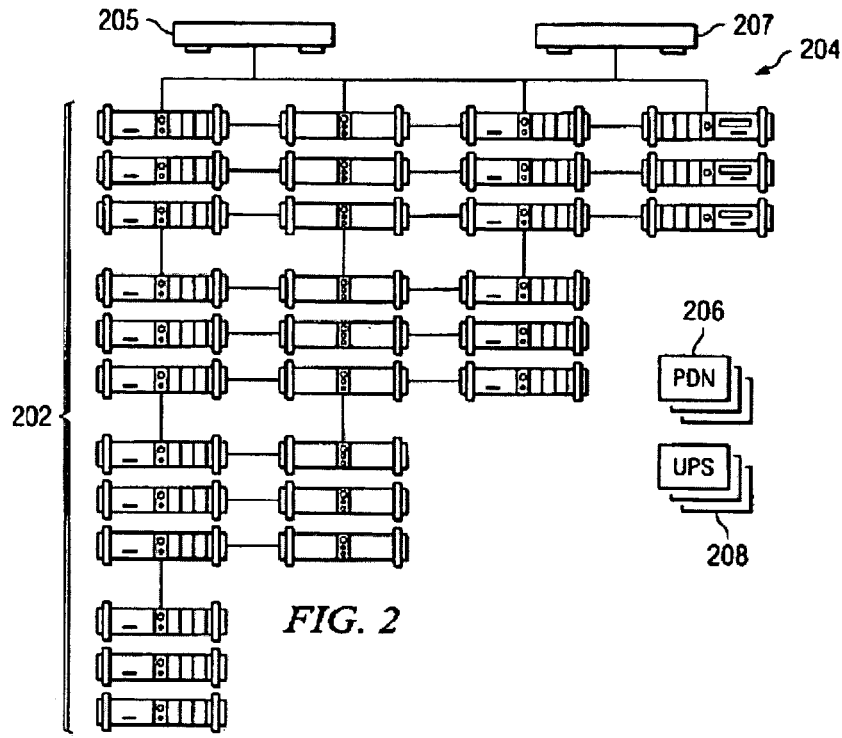
FIG. 2 is a simplified representation of representative system under test, comprising a set of nodes each of which execute a distributed software application instance, and against which the automated testing framework is used to exercise a test suite.

In this representative embodiment, as illustrated in FIG. 2, the system under test is an archive cluster application that provides an archival storage management system. A storage management system of this type is defined by a set of nodes that potentially comprise different hardware and thus may be considered "heterogeneous." A node typically has access to one or more storage disks, which may be actual physical storage disks, or virtual storage disks, as in a storage area network (SAN). The archive cluster application that is supported on each node may be the same or substantially the same. Using the system, enterprises can create permanent storage for many different types of fixed content information such as documents, e-mail, video, and the like, among others. As described in U.S. Publication No. 2005/0120025, the archive cluster application is a distributed software application executed on each node that captures, preserves, manages, and retrieves digital assets. As illustrated in FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. Preferably, data is replicated across the cluster so that the archive is protected from device failure. If a disk or node fails, the cluster automatically fails over to other nodes in the cluster that maintain replicas of the same data.

The illustrative cluster comprises nodes 202, a pair of network switches 204, power distribution units (PDUs) 206, and, optionally, uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and network interface (NIC) cards. The network switches 204 typically comprise an internal switch 205 that enables peer-to-peer communication between nodes, and an external switch 207 that allows extra-cluster access to each node. PDUs 206 are used to power all nodes and switches, and the UPSs 208 are used that protect all nodes and switches. Typically, a cluster is connectable to a network, such as the public Internet, an enterprise intranet, or other wide area or local area network. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool. Client applications access the cluster through one or more types of external gateways such as standard UNIX file protocols, or HTTP APIs. The archive preferably is exposed through a virtual file system that sits under any standard UNIX file protocol-oriented facility.

Figure 3:
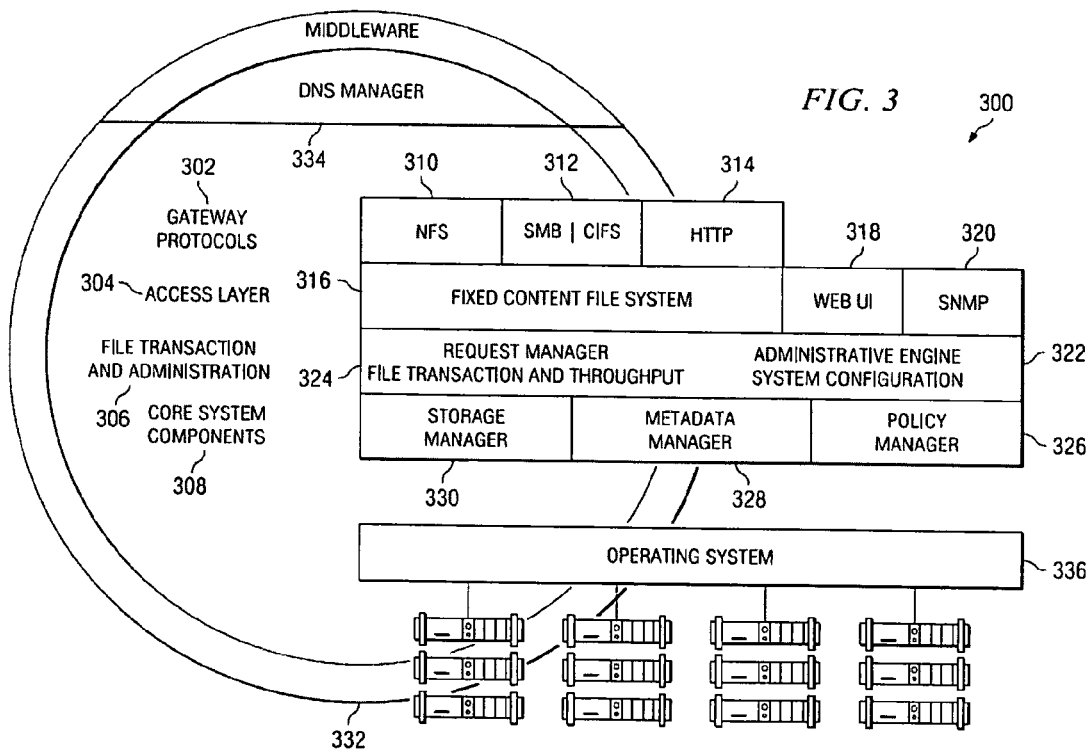
FIG. 3 is a high level representation of the various components of an archive cluster application executing on a given node in the system of FIG. 2.

In this example testing environment, the archive cluster application runs on a redundant array of independent nodes (H-RAIN) that are networked together (e.g., via Ethernet) as a cluster. Each node runs an instance 300 of a distributed application comprised of several runtime components as illustrated in FIG. 3. As will be described, the present invention generates test cases for this system under test. The software components comprise a gateway protocol layer 302, an access layer 304, a file transaction and administration layer 306, and a core components layer 308. The gateways provide native file services such as NFS 310 and SMB/CIFS 312, as well as a Web services API to build custom applications. HTTP support 314 is also provided. The access layer 304 provides access to the archive. A fixed content file system (FCFS) 316 emulates a native file system to provide full access to archive objects. The access layer 304 preferably also includes a Web user interface (UI) 318 and an SNMP gateway 320. The Web user interface 318 provides interactive access to an administration engine 322 in a file transaction and administration layer 306. The SNMP gateway 320 provides storage management applications access to the administration engine 322, enabling them to securely monitor and control cluster activity. The administration engine monitors cluster activity, including system and policy events.

The file transaction and administration layer 306 also includes a request manager process 324. The request manager 324 manages requests from the external world (through the access layer 304), as well as internal requests from a policy manager 326 in the core components layer 308. In addition to the policy manager 326, the components may include a metadata manager 328, and one or more instances of a storage manager 330. The storage manager 330 on a given node is responsible for managing the physical storage devices. The request manager 324 is responsible for executing the set of operations needed to perform archive actions by interacting with other components within the system. A metadata manager 328 preferably is installed on each node. Collectively, the metadata managers in a cluster act as a distributed database, managing archive objects. The storage manager 330 provides a file system layer available to all other components in the distributed application. Preferably, it stores the data objects in a node's local file system. The storage manager 330 also provides system information, integrity checks on the data, and the ability to traverse local directly structures. As also illustrated in FIG. 3, the cluster manages internal and external communication through a communications middleware layer 332 and a DNS manager 334. The application instance executes on a base operating system 336.

A cluster's primary responsibility is to store an unlimited number of files on disk reliably. The automated testing framework as previously described may be used to exercise the cluster in a live operating environment or in a testing facility or laboratory. Thus, in one testing scenario, the automated testing framework is capable of leveraging nodes within a testing laboratory (whether locally or across a computer network) to set up a RAIN or SAN cluster. In this process, the framework uses its own native deploy software or leverages an external module to install the cluster in various configurations. It then uses validates the cluster's health and executes the test suite. The tests exercise the cluster but, in effect, are not the concern of the automated testing framework itself, which functions merely as a test harness. In particular, the automated testing framework automatically allocates, installs and verifies a given cluster, providing a "clean room" environment for tests to be ran against that allocated cluster; it takes snapshots of the cluster in between tests, preferably dumping logs and database images. Otherwise, however, the framework stays out of the way of a given test or test suite and simply records the test's success or failure. Thus, the framework typically does not interface with a given test; rather, a test communicates with the framework usually just to pass on the test result (a pass or a fail). The framework records and logs the output of the tests, but otherwise the test script can do whatever damage or alteration to the cluster that it likes without impairing a given test suite. Such serious damage or alteration could include, for example, dropping nodes, corrupting databases, corrupting data, and the like. The framework addresses any such destruction or alteration issues by re-installing the "clean" environment before a next test in the suite is run. Indeed, in many instances it will be desirable to affirmatively flag the framework to re-install the cluster between tests so that the cluster operates, in effect, in a stable "clean room" environment (e.g., by ensuring that all gateways are up and functional, that the entire cluster is healthy, that required software is installed, running and patched, and the like) for each test.

Thus, according to an object of the invention, tests within a given test suite do not have to reference directly or indirectly any of the framework's control functionality (e.g., objects, methods, classes, or the like that comprise the framework, or the framework's daemon). In effect, the framework is abstracted away from both the underlying system under test, as well as the test themselves. This architecture obviates a centralized control or management scheme and provides unique advantages over the prior art, which operate as closed systems or systems in which the tests have to be written for the particular testing environment. Each of the tests in a suite is independent and can be run in any order.

As noted above, preferably the framework daemon has a number of supporting tools, namely, executable modules, that provide the various functions required. In the cluster example, the framework daemon runs test suites (or batches), records the results in a database, and stores node images and logs in a web-accessible directory on a local machine's web server. The daemon preferably emails all exceptions, failures, crashes and the like to a target set of email recipients, or otherwise exports such information to a bug tracking system. Thus, the framework provides a functional, cluster level regression test running harness that is highly configurable and that is test language agnostic.

The framework also is capable of running white-box testing. Any test that can run on a series of hosts, or even a single host, can be run within the automated test framework. As noted above, one of the advantages of the framework is that it is lenient or flexible enough to allow a test to do anything to a running cluster. There may be tests that expand the size of a cluster, those that reface the cluster to be component-test drivers, and even tests that test the installation system itself. The framework provides this flexibility as noted above by staying out of the test's way. Thus, there is no theoretical limit to what a given quality assurance engineer or developer can put within the harness.

Figure 4:
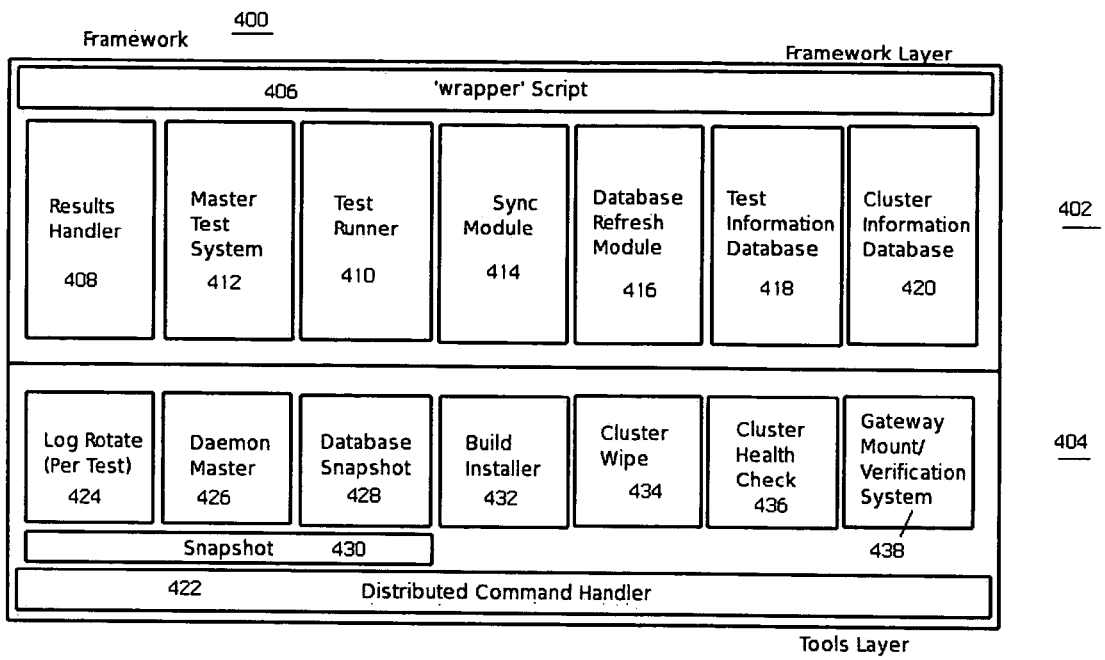
FIG. 4 illustrates a block diagram of a preferred embodiment of the automated testing framework for use to exercise the cluster shown in FIGS. 2-3.

Referring now to FIG. 4, a block diagram is shown of a particular implementation of the automated testing framework for use, for example, with a distributed cluster application. As has been described, the framework is a toolbox with a wrapper in the form of the daemon. It is an extensible framework that provides functional, cluster-level testing, preferably built with common, extensible, simple tools, even tools that can utilized in otherwise day-to-day cluster management.

As illustrated in FIG. 4, the framework 400 according to the embodiment has two layers: a framework layer 402, and a tools layer 404. The framework layer 402 comprises any logic, modules, scripts or databases that may be required to the framework to "know" about itself, the clusters (and nodes therein) and the required tests (and execution of those tests). The tool layer 404, in contrast, comprises those tools that facilitate the de-centralized management of the cluster and perform various tasks including, without limitation, build installation, log management, cluster cleaning, database queries, and the like. Preferably, the tools (or at least some of them) are non-interactive, automated and re-usable, and do not require centralized management or control.

Referring now to FIG. 4, the daemon 406 is a network-accessible script that allocates, installs, and verifies the cluster by leveraging separate logical modules. As previously described, this daemon listens for inbound requests to run a given suite against a target cluster. The results handler module 408 manages the data generated during the tests. Thus, for example, by default results are records in a results directory, which is preferably keyed by date/time/suite/test name. Results for each test may be stored as a flat text file format and uploaded into a current results database system. After a run is complete, if a results upload flag is enabled, the daemon 406 uploads these results into a results database. The results handler module 408 also may email the results in a CSV-style format for uploading into another system, and it may push those results into a database, or store the results in files on a disk for maximum accessibility. The test runner module 410 is a script that is ultimately responsible for the execution of the actual test suite. This script handles all details required for the test (e.g., configuring mount points, initializing resources, and the like). This module preferably executes tests in a non-blocking/timed out manner. It expects tests to hang, or to not complete; it monitors those tests and kills them as needed. The master test system module 412 uses the test runner module 410 and generates master level suites (framework suites, as opposed to individual suites) to serve as a batching system for system-level categories (e.g., long bum in, quick smokes, performance, and the like. The code repository synchronization module 414 is responsible for handling all repository (e.g., Perforce) refreshes and for pulling the code builds from the source control server. A database module tells this module where to find the required tests, and whether or not to refresh those tests. If a test must be refreshed, this module downloads those tests directly from the repository. Preferably, the code repository synchronization module synchronizes files for a given test suite, irrespective of whether it has a local copy. Thus, the source control system is deemed to be the master copy; the framework, in contrast, does not trust its local copies. The database refresh module 416 handles any and all database connectivity. This module is used to get information about the cluster, and to provide that information to the daemon. The refresh module 416 is also used to get required test/suite information. The test information database 418 is a database that comprises information about each test in a test suite, as well as any required information for any such test to execute. The cluster information database 420 comprises any pertinent information about the clusters against which the framework will be exercised. This database may be polled before any test run (or before a given test suite is run) to find the required information.

The tools layer 404 components comprise a distributed command handler module 422 that is a wrapper to the tools in the layer. The module 422 preferably is accessible via an SSH connection to enable the tools to interact with the cluster non-interactively, or via scripts or an open API. Access to the distributed command handler module preferably requires authentication. A log rotate or "imager" module 424 dumps system logs, checks for error messages in the cluster node logs, and images databases across the cluster nodes after a test is complete. A daemon master module 426 is a script that allows granular control over daemons on the cluster, such as starting and stopping. A database snapshot module 428 is provided to grab a snapshot of the databases spread out across the cluster, and pulls those snapshots back to the local machine. The snapshot module 430 is a tool that actually images the cluster, and it may operate with the log rotate module to get the logs from all of the cluster nodes in between the various test runs of a given test suite. The snapshot module 430 also grabs an image of a current database on all the nodes in the cluster, copies those files back to the local machine, and stores them alongside the logs for that test/suite run. The snapshot module may also verify a cluster's integrity. A build installer module 432 is a script that leverages the distributed command handler module to install the defined build across the target cluster, including any and all required configuration scripts. The module 432 may be implemented as script that automatically determines the required values based on information in a configuration database. A cluster clean module 434 wipes or cleans the target cluster non-interactively, formatting the disks, database, logs, files, and the like. A cluster health monitor 436 is a script that verifies the integrity of a running cluster, also checking for valid/invalid processes, swap usage, and the like. At any point, the cluster health monitor 436 is called to check up on the cluster. Finally, a gateway mount verification module 438 is used to verify the health of the various cluster gateways and to perform various access methods against those gateways; this module thus operates to verify availability of a given cluster (and the nodes within that cluster). The module may also be used as a mounting system for the test runner module to call to mount required resources.

It should be noted that the tools shown in FIG. 4 are not necessarily exhaustive or exclusive, as various other tools and modules may be used by the framework Moreover, the line in FIG. 4 between the tools layer and the function/daemon layer is merely representative and should be taken to limit the scope of the invention in any way. As noted above, the framework (regardless of how implemented) is merely a platform that simply drives the tests while providing them a "clean room" in which to operate, all the while ensuring cluster state as the test suite progresses. In a representative embodiment, the automated testing framework executes on a machine running commodity hardware and the Linux operating system. This is not a limitation, however. As noted above, the daemon may be executed on a given machine while one or more of the modules illustrated in FIG. 4 may operate on the same machine or on one or more other machines. Thus, the framework also has the ability to allocate for, and leverage non-Linux based clients, such as clients that execute on Solaris, HPUX, AIX, IRIX, OS/X, WinXP, Windows2000, or the like. Thus, in an alternative embodiment, the framework includes appropriate functionality to detect a given test's platform and, upon detection, to push execution of the test off to a specific platform that can support it.

The following is an example of how the automated testing framework operates upon receiving an execution request such as:

```
[root@client/home/daemon]#./daemon -s risfs -c clusterfoo -b http://pathtobuildrpm/foo.rpm --refresh --report
```

This request causes the following operations:
Run the daemon
Run the risfs test suite:
. . . against clusterfoo
. . . with build foo
. . . and refresh tests from PerForce to get a latest test suite
. . . report results to a database Thus, in response the request, the framework executes the daemon wrapper, gets the cluster information (checking to see if the cluster is running or has a build on it; cleaning if necessary), downloads the defined build, deploys the build to the cluster (install), starts the cluster, checks the cluster's health, pulls all required tests from the database (synchronizing tests from the code repository if necessary), performs local test setup as needed (e.g., make mount points), performs the tests, images the system between tests (checks integrity, obtain logs, and the like), shuts down the system when the tests are done, and reports/publishes the test results and images.

Figure 5:
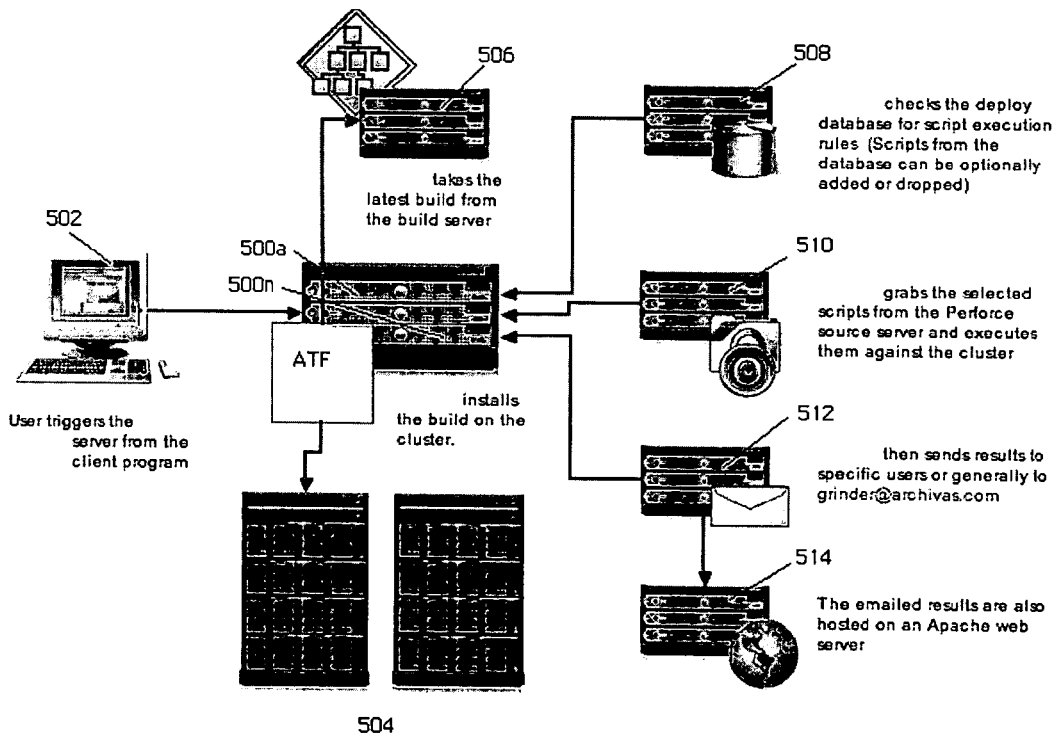
FIG. 5 illustrates an embodiment of the automated testing framework in an enterprise environment.

FIG. 5 provides another illustration of the automated test framework (ATF). In one embodiment, an ATF server 500a (e.g., one of a set of servers 500a-n) executes an ATF scheduler. ATF server 500a issues a job to an ATF client that executes on machine 502. The ATF client executes the daemon. In this example, the daemon issues instructions to the ATF server 500a (or one of the other servers in the server group), which in turn downloads a chosen (or latest) QA build and any necessary test tools from a build server 506, identifies the target cluster 504 (e.g., from a database of available clusters), installs the build on the target cluster 504, and verifies the installation. Under the control of the daemon, the server 500 then downloads and runs one or more test suites against the cluster. In this particular example, this is accomplished by having the ATF server 500 check a central database 508 for script execution rules, fetching the selected scripts from a source server 510, and then executing the scripts. The ATF server 500 then sends the results to one or more specific users or, more generally, to a mailing list (e.g., using an email server 512). FIG. 6 illustrates a portion of a representative email indicating that a given nightly test run has been completed and including information about the system, its configuration, the test results, and the like. The email also preferably includes a link to the full test data, which may include the system image data. By selecting the link, the user can review the test result details directly. Email results may also be hosted on a web server 514 or supplied to a defect tracking system, as previously described. In one embodiment, the tests are run periodically, e.g., nightly, against dedicated clusters of various sizes and configurations.

As noted above, any of the machines illustrated may be run different hardware, different software, or different hardware and different software. As a result, the framework is highly scalable. It is flexible, easily extensible, and preferably test-language and client-platform agnostic. This implementation ensures that the framework can run any test, in any language.

The following illustrates the type of information that may be stored in a database for a given test:

Test Suite
Test sub-suite
Test name/code/serial
Test location (in perforce)
Required test flags for execution (ie: -n $testnum, -s $port, etc)
Is this a file system test? (ie: does it need a mount point?)
If=true,
does it need a given mount?
Does it need a nfs mount?
Does it need both?
Is this an http test?
If=true,
How is the http url supplied?
Loop on error?
Loop count on Error (max n)

While the process flow diagrams and the above description provide a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. As noted above, a given implementation of the present invention is software written in a given programming language that runs on a standard hardware platform running an operating system such as Linux.

While given components of the system have been described separately, one of ordinary skill will appreciate that some of the functions may be combined or shared in given instructions, program sequences, code portions, and the like.

Having described our invention, what we claim is as follows.

The invention claimed is:

1. A framework for automated testing of a system, comprising: a processor; and a process executable by the processor, the process responsive to receipt of a request to execute one or more tests of a test suite against the system by unordered steps of: (a) executing first code that obtains a given software build for the system; (b) executing second code that deploys the given software build on the system and also verifies an operational state of the system, or given components in the system, as the given software build is deployed or is being deployed; (c) executing third code to obtain information associated with the one or more tests; (d) executing fourth code to initiate execution of each of the one or more tests; (e) executing fifth code to capture an image of a state of the system after a given test of the test suite is executed, the image being a snapshot of the state of the system under test after the given test is executed and before a next test of the test suite is executed, the image including debugging information; and (f) executing sixth code to export to at least one data repository information concerning an outcome of the one or more tests.

2. The framework as described in claim 1 wherein the second code also returns given resources to an initial state prior to deploying the given software build on the system.

3. The framework as described in claim 1 wherein the second code also places given resources in a given state prior to deploying the given software build on the system.

4. The framework as described in claim 1 wherein the third code is executed to obtain from a code repository the information associated with the one or more tests.

5. The framework as described in claim 2 wherein the second code also returns given resources to an initial state and re-installs the given software build following execution of a given test.

6. The framework as described in claim 1 wherein the repository is one of a database, a Web server, an email list, or a defect tracking system.

7. The framework as described in claim 6 wherein at least one of the first, second, third, fourth, fifth or sixth code is executed on a second machine distinct from a first machine on which the process executes.

8. The framework as described in claim 7 wherein the first and second machines run different operating systems.

9. The framework as described in claim 1 wherein at least one of the tests is written in a language that is distinct from a programming language in which the process is written.

10. The framework as described in claim 1 wherein each of the one or more tests are independent and are executed in any order.

11. A method of automated testing of a system, comprising the unordered steps: responsive to a request, executing code that calls a set of one or more code modules, the one or more code modules implementing the following steps, in an automated manner: allocating, installing and verifying a target instance of the system, wherein the target instance of the system comprises a given build of a software program; obtaining a given test suite having one or more tests; executing each test in the given test suite; after each test is executed and before executing a next test, capturing an image of a state of the target instance of the system, the image including debugging information; prior to executing a next test in the given test suite, re-allocating, installing and verifying the target instance of the system; following completion of the test suite, exporting given information about the one or more tests in the given test suite.

12. The method as described in claim 11 wherein the given information is exported to one of a database, a Web server, an email list or a defect tracking system.

13. The method as described in claim 11 wherein the target instance of the system is re-allocated, installed and verified as a result of a failure in the system or a system component during a prior test.

14. The method as described in claim 11 wherein the target instance of the system is re-allocated, installed and verified as a result of setting a configuration parameter.

15. The method as described in claim 11 wherein the step of re-allocating, installing and verifying the target instance of the system further includes modifying a configuration of the system.

16. The method as described in claim 11 wherein the one or more of the code modules are executed on a machine distinct from the machine upon which the code is executed.

17. The method as described in claim 11 wherein test files associated with the given test suite are obtained from a code repository.

18. The method as described in claim 11 wherein the code that calls the one or more code modules is written in a language that is independent of a language in which a given test is written.

19. The method as described in claim 11 wherein the code executes autonomously and without reference to a given test.

20. A method of automated testing of a system, comprising: responsive to receipt of a request to execute a given test suite, automatically allocating, installing and verifying given resources in the system by returning given resources to an initial state, installing a given software build, and re-booting; executing the given test suite; generating information concerning an outcome of at least one test in the given test suite; capturing an image of a state of the system between each pair of tests in the given test suite, the image including debugging information; selectively re-allocating, installing and verifying the given resources following execution of a test in the given test suite; and exporting information associated with each test to one or more repositories; wherein a given test in the test suite is executable irrespective of its implementation language.

21. The method as described in claim 20 wherein the given resources in the system are verified dynamically as the given resources become operational.

22. The method as described in claim 20 wherein the information indicates whether a given test was a success or a failure.

23. The method as described in claim 20 wherein the step of selectively re-allocating, installing and verifying occurs as a result of a failure in the system or a system component during a prior test, or in response to setting of a configuration parameter.

24. The method as described in claim 20 wherein at least one of the steps is carried out under control of a daemon that executed autonomously with respect to execution of a given test.

25. The method as described in claim 20 wherein the given resources comprise one of: given hardware, given software, or a combination of given hardware and given software.

26. The method as described in claim 20 wherein the repositories include one of: a database, a Web server, an email list or a defect tracking system.

27. The method as described in claim 24 wherein the daemon is executed on a first machine and at least one test in the test suite is executed on a second machine.

28. The method as described in claim 27 wherein the first and second machines execute different operating systems.

* * * * *